United States Patent
Clough (10) Patent No.: US 6,572,197 B1
(45) Date of Patent: Jun. 3, 2003

(54) VEHICLE LATCH ASSEMBLY

(76) Inventor: Joel E. Clough, 332 Ashswamp Rd., New Market, NH (US) 03857

( * ) Notice: Subject to any disclaimer, the term of this patent is extended or adjusted under 35 U.S.C. 154(b) by 0 days.

(21) Appl. No.: 09/853,486

(22) Filed: May 11, 2001

(51) Int. Cl.[7] ............................................. B60P 1/273
(52) U.S. Cl. .................. 298/23 B; 298/23 A; 298/23 S
(58) Field of Search .......................... 298/23 A, 23 D, 298/23 R, 23 M, 23 S, 23 B; 292/26, 134, 135, 233, 236, 237

(56) References Cited

U.S. PATENT DOCUMENTS

| | | | | |
|---|---|---|---|---|
| 670,092 A | * | 3/1901 | Woodbury | 105/274 |
| 907,254 A | * | 12/1908 | Lied | 105/275 |
| 1,351,436 A | * | 8/1920 | Olsen | 296/55 |
| 1,394,521 A | | 10/1921 | Akers | |
| 1,743,094 A | * | 1/1930 | Barrett | 298/38 |
| 1,792,680 A | | 2/1931 | Dewey | |
| 1,883,473 A | * | 10/1932 | Barrett | 296/51 |
| 2,226,901 A | | 12/1940 | Fairbanks | |
| 2,419,636 A | | 4/1947 | Foy | |
| 2,552,442 A | * | 5/1951 | McClish | 298/23 M |
| 2,954,995 A | * | 10/1960 | Grise | 298/23 B |
| 3,072,438 A | * | 1/1963 | Livingston et al. | 298/23 B |
| 3,078,121 A | * | 2/1963 | Dempster et al. | 296/56 |
| 3,379,475 A | * | 4/1968 | Holland | 298/23 B |
| 3,811,729 A | | 5/1974 | Vornberger | |
| 4,032,192 A | | 6/1977 | Jensen | |
| 4,762,345 A | * | 8/1988 | Stluka et al. | 292/26 |

* cited by examiner

Primary Examiner—D. Glenn Dayoan
Assistant Examiner—Paul Chenevert (57) ABSTRACT

A vehicle latch assembly for a vehicle that has a cargo bed with a gate that is pivotal between a horizontal transporting condition and an inverted dumping condition. The vehicle latch assembly includes a latch for keeping the gate closed when the cargo bed is in the horizontal transporting condition. The latch comprises a hook portion that includes a bar formed thereon. The latch is positionable between a hook position and an unhooked position. The hook position is characterized by the bar being selectively abutted against the gate when the cargo bed is in the horizontal transporting condition. The unhooked position is characterized by the bar being positioned relatively away from the gate when the cargo bed is in the inverted dumping condition. An actuator assembly is mountable to the vehicle and operationally coupled to the latch for moving the latch between the hooked position and the unhooked position.

18 Claims, 5 Drawing Sheets

VEHICLE LATCH ASSEMBLY

BACKGROUND OF THE INVENTION

1. Field of the Invention

The present invention relates to vehicle latch devices and more particularly pertains to a new vehicle latch assembly for a vehicle that carries cargo and has a cargo bed with a gate that is pivotal between a horizontal transporting condition and an inverted dumping condition.

2. Description of the Prior Art

The use of vehicle latch devices is known in the prior art. More specifically, vehicle latch devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,032,192; U.S. Pat. No. 1,792,680; U.S. Pat. No. 3,811,729; U.S. Pat. No. 1,394,521; U.S. Pat. No. 2,226,901; and U.S. Pat. No. 2,419,636.

While these devices fulfill their respective, particular objectives and requirements, the aforementioned patents do not disclose a new vehicle latch assembly. The inventive device includes a latch for keeping the gate of the vehicle closed when the cargo bed is in the horizontal transporting condition. The latch comprises a hook portion that includes a bar formed thereon. In one embodiment of the present invention, the latch is positionable between a hook position and an unhooked position. The hook position is characterized by the bar being selectively abutted against the gate when the cargo bed is in the horizontal transporting condition. The unhooked position is characterized by the bar being positioned relatively away from the gate when the cargo bed is in the inverted dumping condition. An actuator assembly is mountable to the vehicle and operationally coupled to the latch for moving the latch between the hooked position and the unhooked position.

In these respects, the vehicle latch assembly according to the present invention substantially departs from the conventional concepts and designs of the prior art, and in so doing provides an apparatus primarily developed for the purpose of a vehicle that carries cargo and has a cargo bed with a gate that is pivotal between a horizontal transporting condition and an inverted dumping condition.

SUMMARY OF THE INVENTION

In view of the foregoing disadvantages inherent in the known types of vehicle latch devices now present in the prior art, the present invention provides a new vehicle latch assembly construction wherein the same can be utilized for a vehicle that carries cargo and has a cargo bed with a gate that is pivotal between a horizontal transporting condition and an inverted dumping condition.

The general purpose of the present invention, which will be described subsequently in greater detail, is to provide a new vehicle latch assembly apparatus and method which has many of the advantages of the vehicle latch devices mentioned heretofore and many novel features that result in a new vehicle latch assembly which is not anticipated, rendered obvious, suggested, or even implied by any of the prior art vehicle latch devices, either alone or in any combination thereof.

To attain this, the present invention generally comprises a latch for keeping the gate of the vehicle closed when the cargo bed is in the horizontal transporting condition. The latch comprises a hook portion that includes a bar formed thereon. In one embodiment of the present invention, the latch is positionable between a hook position and an unhooked position. The hook position is characterized by the bar being selectively abutted against the gate when the cargo bed is in the horizontal transporting condition. The unhooked position is characterized by the bar being positioned relatively away from the gate when the cargo bed is in the inverted dumping condition. An actuator assembly is mountable to the vehicle and operationally coupled to the latch for moving the latch between the hooked position and the unhooked position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle latch assembly apparatus and method which has many of the advantages of the vehicle latch devices mentioned heretofore and many novel features that result in a new vehicle latch assembly which is not anticipated, rendered obvious, suggested, or even implied by any of the prior art vehicle latch devices, either alone or in any combination thereof.

It is another object of the present invention to provide a new vehicle latch assembly which may be easily and efficiently manufactured and marketed.

It is a further object of the present invention to provide a new vehicle latch assembly which is of a durable and reliable construction.

An even further object of the present invention is to provide a new vehicle latch assembly which is susceptible of a low cost of manufacture with regard to both materials and labor, and which accordingly is then susceptible of low prices of sale to the consuming public, thereby making such vehicle latch assembly economically available to the buying public.

Still yet another object of the present invention is to provide a new vehicle latch assembly which provides in the apparatuses and methods of the prior art some of the advantages thereof, while simultaneously overcoming some of the disadvantages normally associated therewith.

Still another object of the present invention is to provide a new vehicle latch assembly for a vehicle that carries cargo and has a cargo bed with a gate that is pivotal between a horizontal transporting condition and an inverted dumping condition.

Yet another object of the present invention is to provide a new vehicle latch assembly which includes a latch for keeping the gate of the vehicle closed when the cargo bed is in the horizontal transporting condition. The latch comprises a hook portion that includes a bar formed thereon. In one embodiment of the present invention, the latch is positionable between a hook position and an unhooked position. The hook position is characterized by the bar being selectively abutted against the gate when the cargo bed is in the horizontal transporting condition. The unhooked position is characterized by the bar being positioned relatively away from the gate when the cargo bed is in the inverted dumping condition. An actuator assembly is mountable to the vehicle and operationally coupled to the latch for moving the latch between the hooked position and the unhooked position.

Still yet another object of the present invention is to provide a new vehicle latch assembly that ensures that the gate of the vehicle remains securely locked when the cargo bed is in the horizontal transporting condition.

Even still another object of the present invention is to provide a new vehicle latch assembly that automatically activated when the cargo bed is moved between the horizontal transporting condition and the inverted dumping position. The automatic nature of the present invention removes the possibility of human error operating a latch device found in the prior art.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 5 thereof, a new vehicle latch assembly embodying the principles and concepts of the present invention and generally designated by the reference numeral 10 will be described.

Figure 1:
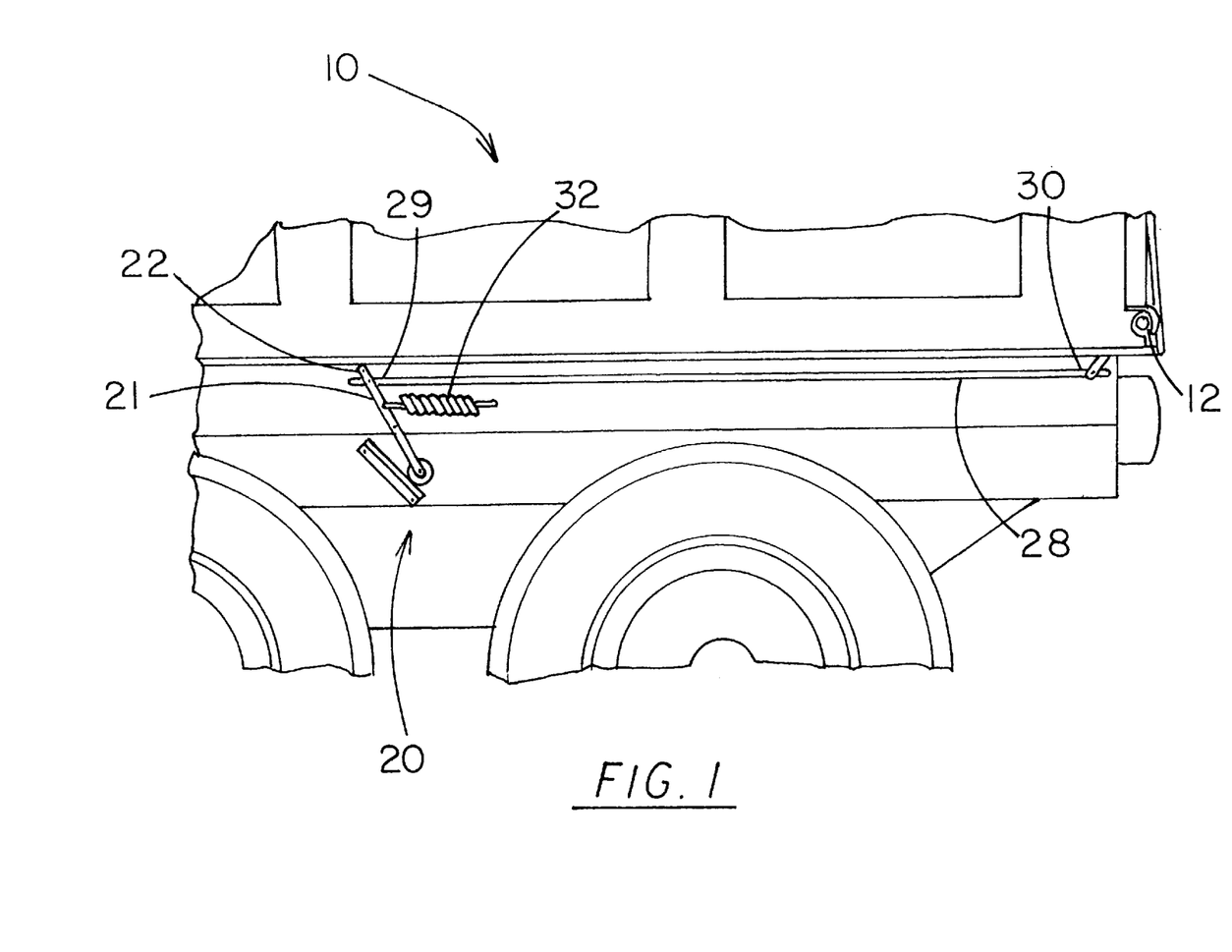
FIG. 1 is a schematic frontal view of a new vehicle latch assembly according to the present invention.
Figure 2:
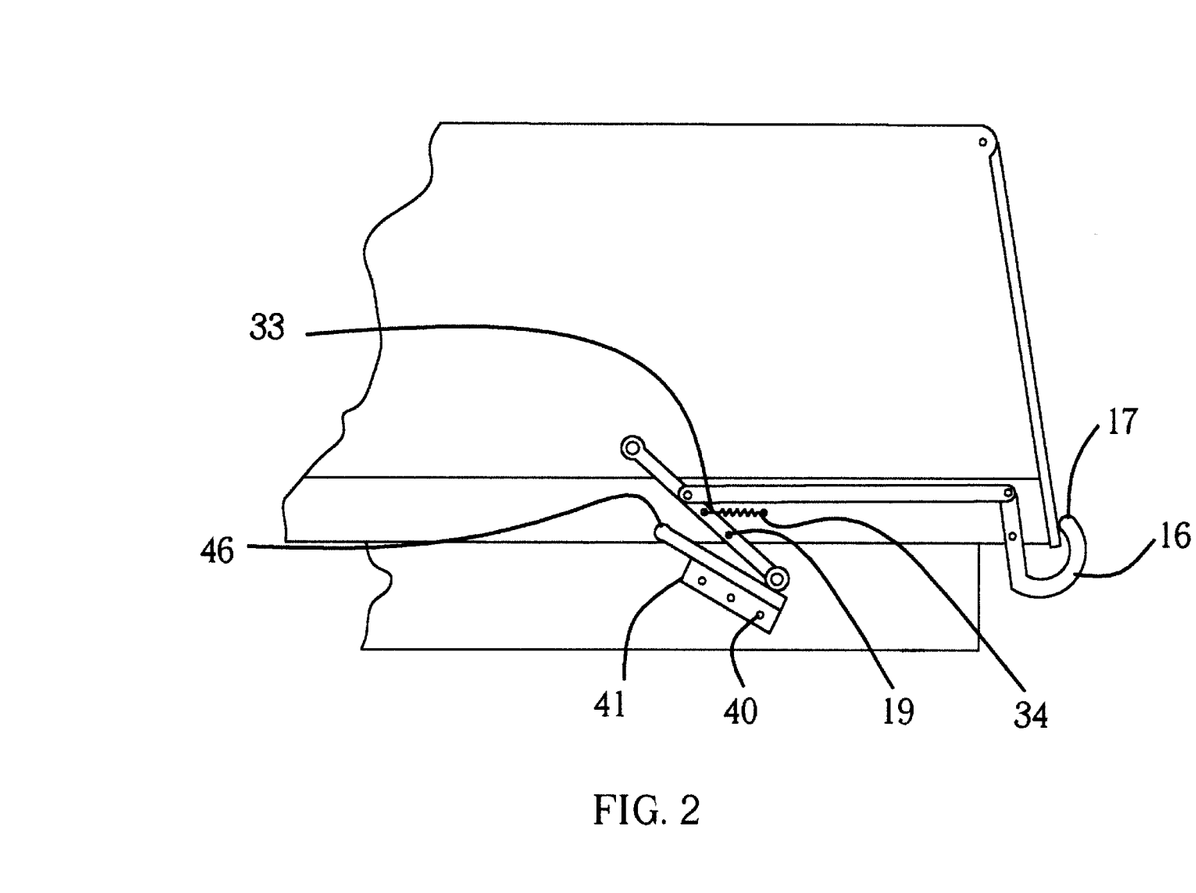
FIG. 2 is a schematic frontal view of the present invention.
Figure 3:
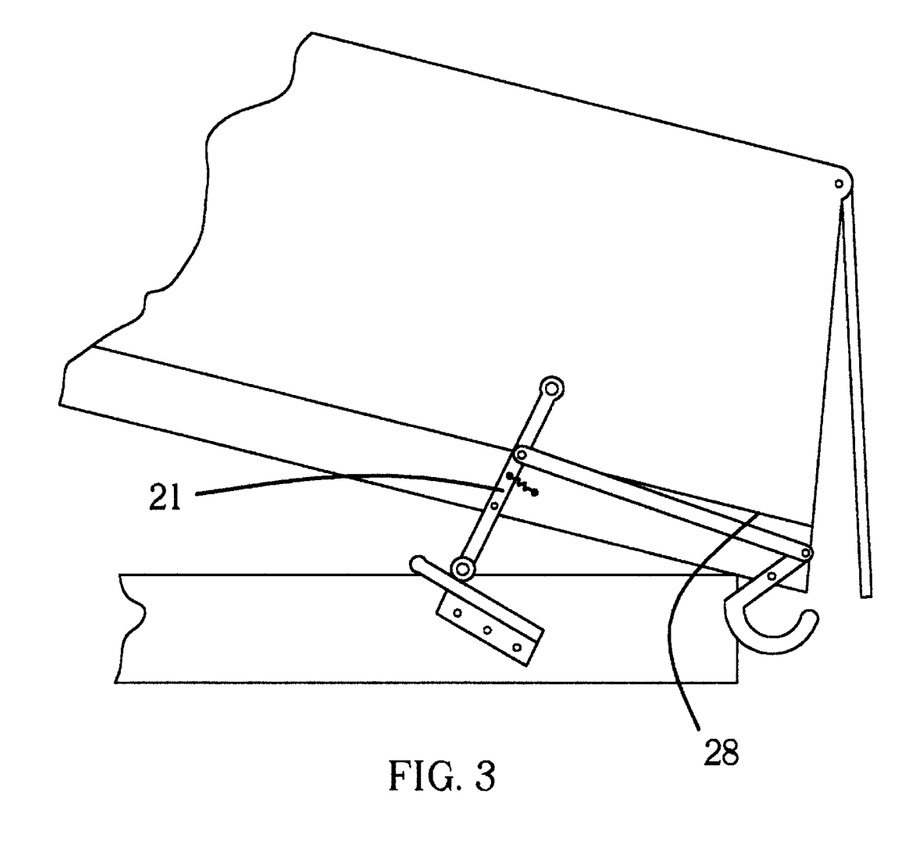
FIG. 3 is a schematic frontal view of the present invention.
Figure 4:
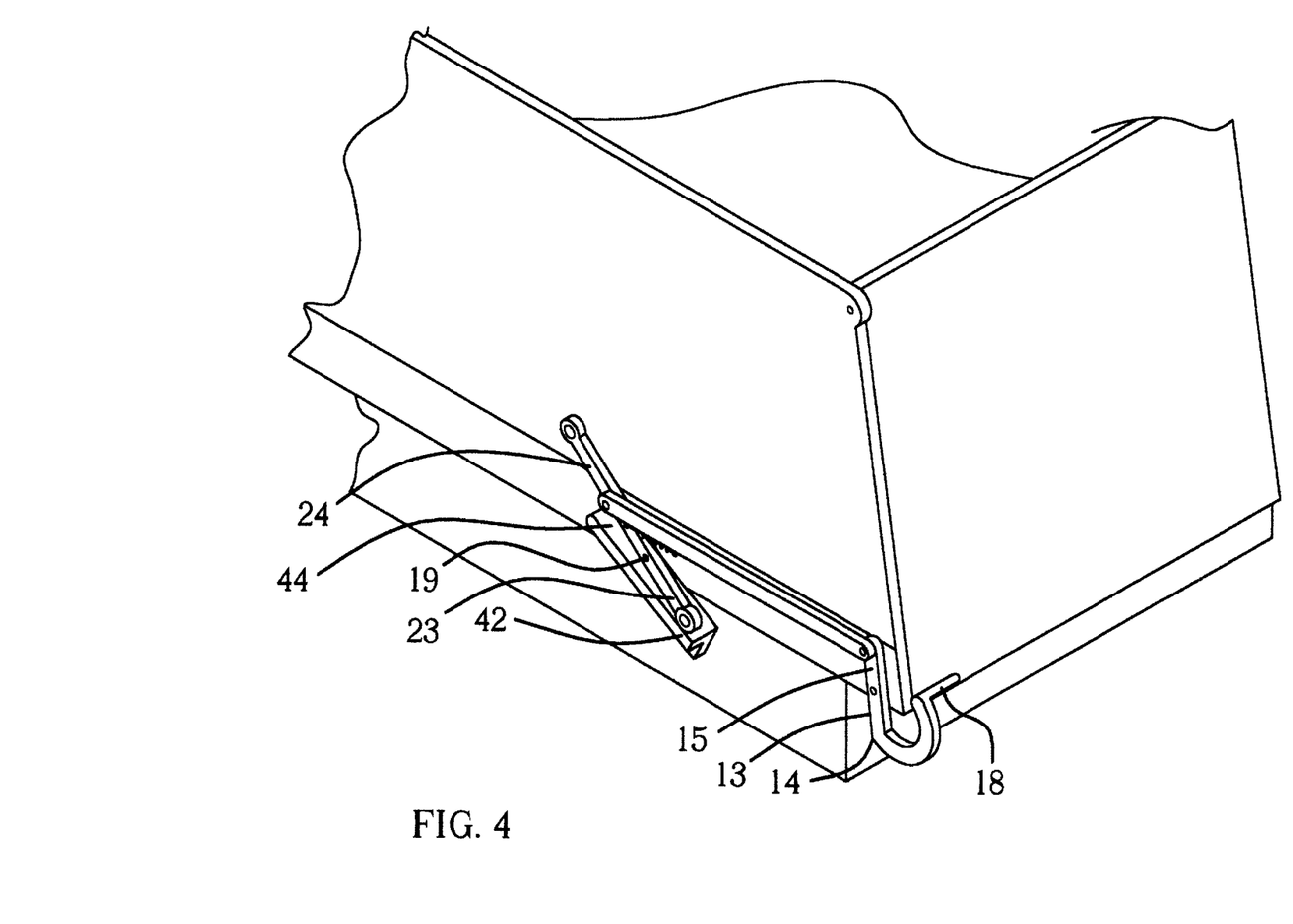
FIG. 4 is a schematic perspective view of the present invention.
Figure 5:
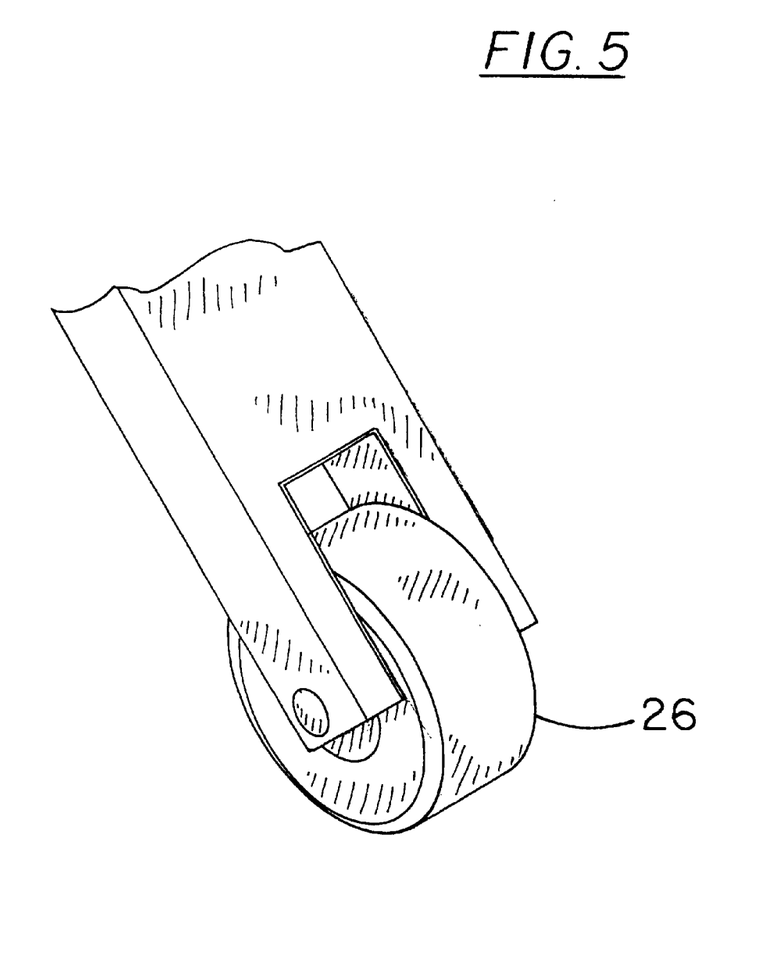
FIG. 5 is a schematic perspective view of the present invention.

As best illustrated in FIGS. 1 through 5, the vehicle latch assembly 10 generally comprises a latch 12 for keeping the gate of the vehicle closed when the cargo bed is in the horizontal transporting condition, as particularly illustrated in FIGS. 1, 2 and 4. The latch 12 may comprise a mounting portion 13 that includes a first end 14 and second end 15. The mounting portion 13 may be pivotally mountable to one of the side walls of the cargo bed at a pivot 19 and may be positioned generally adjacent to the gate of the cargo bed.

The latch 12 also comprises a hook portion 16 that is mounted on the first end 14 of the mounting portion 13. The hook portion 16 may include a generally arcuate shape such that an end 17 of the hook portion 16 is positioned generally nearer the second end 15 of the mounting portion 13 than the first end 14 of the mounting portion 13. The end 17 of the hook portion 16 includes a bar 18 formed thereon for selectively abutting the gate of the cargo bed when the cargo bed is in the horizontal transporting condition. The bar 18 may lie in plane orientated generally perpendicular to a longitudinal axis of the mounting portion 13 of the latch 12.

In one embodiment of the present invention, the latch 12 is positionable between a hook position and an unhooked position. As illustrated in FIGS. 2 and 4, the hook position is characterized by the bar 18 being selectively abutted against the gate for preventing the gate from opening when the cargo bed is in the horizontal transporting condition. As illustrated in FIG. 3, the unhooked position is characterized by the bar 18 being positioned relatively away from the gate such that the gate may freely open with respect to the cargo bed when the cargo bed is in the inverted dumping condition.

An actuator assembly 20 is provided for moving the latch 12 between the hooked position and the unhooked position. The actuator assembly 20 may be mountable to the vehicle such that moving the cargo bed from the horizontal transporting condition toward the inverted dumping condition moves the latch 12 from the hooked position toward the unhooked position. The actuator assembly 20 may include a lever 21 that includes a first end 22 and a second end 23. A central portion 24 of the lever 21 may be pivotally mountable on a side surface of the bottom wall of the cargo bed such that the first end 22 of the lever 21 is positioned generally adjacent to one of the side walls of the cargo bed. The second end 23 of the lever 21 is positioned generally adjacent to the frame of the vehicle such that a longitudinal axis of the lever 21 generally intersects a longitudinal axis of the frame of the vehicle. A wheel 26 may be rotatably mounted on the second end 23 of the lever 21.

The lever 21 may be pivotal between a first position and a second position. In one embodiment of the present invention, the first position is characterized by the first end 22 of the lever 21 being positioned relatively closer to the back wall of the cargo bed than the gate of the cargo bed. The second position is characterized by the first end 22 of the lever 21 being position relatively closer to the gate of the cargo bed than the back wall of the cargo bed. The lever 21 may measure approximately twelve inches in length.

A coupling member 28 may be provided for operationally coupling the lever 21 to the latch 12. The coupling member 28 may include a first end 29 and a second end 30. The first end 29 of the coupling member 28 may be pivotally coupled to a portion of the lever 21 between the first end 22 of the lever 21 and the portion of the lever pivotally mountable to the side surface of the bottom wall of the cargo bed. The second end 30 of the coupling member 28 may be pivotally coupled to the second end 15 of the mounting portion 13 of the latch 12 such that moving the first end 22 of the lever 21 from the first position toward the second position moves the latch 12 from the hooked position toward the unhooked position.

A biasing member 32 may be provided for biasing the first end 22 of the lever 21 from the first position toward the second position when the cargo bed moves from the horizontal transporting condition toward the inverted dumping condition. The biasing member 32 may include a first end 33 and a second end 34. The first end 33 of the biasing member 32 may be mounted to a portion of the lever 21 between the first end 22 of the lever 21 and the portion of the lever 21 pivotally mountable to the side surface of the bottom wall of the cargo bed. The second end 34 of the biasing member 32 may be mountable to the side surface of the bottom wall of the cargo bed. The biasing member 32 may comprise a spring.

A track 40 may be provided for moving the lever 21 from the second position toward the first position when the cargo bed moves from the inverted dumping condition toward the horizontal transporting condition. The track 40 may include a securing portion 41 that may be securely mountable to the frame of the vehicle. The track 40 may also include a track portion 42 extending perpendicularly away from the securing portion 41 for selectively receiving the wheel 26 of the lever 21. An upper surface 44 of the track portion 42 may include a lip 46 formed thereon for selectively preventing the wheel 26 from traveling off the track 40. The securing portion 41 is preferably mountable to the frame of the vehicle such that as the cargo bed moves from the inverted dumping condition toward the horizontal transporting condition the wheel 26 travels along the upper surface 44 of the track portion 42 moving the lever 21 from the second position toward the first position. The track 40 may measure approximately eight inches in length.

In use, as the cargo bed moves between the horizontal transporting condition and the inverted dumping condition, the lever 21 moves between the first position and the second position respectively. As the lever 21 moves from the first position toward the second position, the latch 12 moves from the hooked position toward the unhooked position allowing the cargo in the cargo bed to be emptied when the cargo bed is in the inverted dumping condition.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A latching assembly for a vehicle having a cargo bed pivotally mounted on a frame for carrying cargo, the cargo bed being pivotal between a horizontal transporting condition and an inverted dumping condition, the cargo bed having a bottom wall, a back wall and a pair of side walls, a gate being pivotally coupled to and extending between each of the side walls for containing the cargo when the cargo bed is in the horizontal transporting condition, said assembly comprising:

a latch for keeping the gate of the vehicle closed when the cargo bed is in the horizontal transporting condition, said latch comprising a hook portion having a bar formed thereon, said latch being positionable between a hook position and an unhooked position;

an actuator assembly being mountable to the vehicle and operationally coupled to said latch for moving said latch between said hooked position and said unhooked position;

wherein said actuator assembly includes a lever pivotally mountable on a side surface of the bottom wall of the cargo bed, said lever being operationally coupled to said latch; and additionally including a wheel being rotatably mounted on a second end of said lever.

2. The latching assembly of claim 1, wherein said latch additionally comprises a mounting portion being pivotally mountable to one of the side walls of the cargo bed, said hook portion being mounted on a first end of said mounting portion; and wherein said hook portion has a generally arcuate shape.

3. The latching assembly of claim 1, wherein said lever is pivotal between a first position and a second position, wherein said first position is characterized by a first end of said lever being positioned relatively closer to the back wall of the cargo bed than the gate of the cargo bed, wherein said second position is characterized by said first end of said lever being positioned relatively closer to the gate of the cargo bed than the back wall of the cargo bed.

4. The latching assembly of claim 3, additionally including a coupling member for operationally coupling said lever to said latch, a first end of said coupling member being pivotally coupled to a first end of said lever member, a second end of said coupling member being pivotally coupled to said latch such that moving said first end of said lever from said first position toward said second position moves said latch from said hooked position toward said unhooked position.

5. The latching assembly of claim 3, additionally including a biasing member for biasing a first end of said lever from said first position toward said second position when the cargo bed moves from the horizontal transporting condition toward the inverted dumping condition, a first end of said biasing member being mounted to a portion of said lever, a second end of said biasing member being mountable to the side surface of the bottom wall of the cargo bed.

6. The latching assembly of claim 3, additionally including a track mountable to the frame of the vehicle for moving said lever from said second position toward said first position when the cargo bed moves from the inverted dumping condition toward the horizontal transporting condition.

7. The latching assembly of claim 6, wherein said track includes:

a securing portion being securely mountable to the frame of the vehicle;

a track portion extending perpendicularly away from said securing portion for selectively receiving a wheel rotatably mounted on an end of said lever as said lever moves between said first and second positions.

8. The latching assembly of claim 7, wherein an upper surface of said track portion has a lip formed thereon for selectively preventing said wheel from traveling off said track.

9. The latching assembly of claim 7, said securing portion is mountable to the frame of the vehicle such that as said cargo bed moves from said inverted dumping condition toward said horizontal transporting condition said wheel travels along an upper surface of said track portion moving said lever from said second position toward said first position.

10. A latching assembly for a vehicle having a cargo bed pivotally mounted on a frame for carrying cargo, the cargo bed being pivotal between a horizontal transporting condition and an inverted dumping condition, the cargo bed having a bottom wall, a back wall and a pair of side walls, a gate being pivotally coupled to and extending between each of the side walls for containing the cargo when the cargo bed is in the horizontal transporting condition, said assembly comprising:

a latch for keeping the gate of the vehicle closed when the cargo bed is in the horizontal transporting condition, said latch comprising:
a mounting portion having a first end and second end, said mounting portion being pivotally mountable to one of the side walls of the cargo bed and positioned generally adjacent to the gate of the cargo bed;
a hook portion being mounted on said first end of said mounting portion, said hook portion having a generally arcuate shape such that an end of said hook portion is positioned generally nearer said second end of said mounting portion than said first end of said mounting portion, said end of said hook portion having a bar formed thereon for selectively abutting the gate of the cargo bed when the cargo bed is in the horizontal position, said bar lying in plane orientated generally perpendicular to a longitudinal axis of said mounting portion of said latch;
wherein said latch is positionable between a hook position and an unhooked position, wherein said hook position is characterized by said bar being selectively abutted against the gate for preventing the gate from opening when the cargo bed is in the horizontal transporting condition, wherein said unhooked position is characterized by said bar being positioned relatively away from the gate such that the gate may freely open with respect to the cargo bed when the gate of the cargo bed is in the inverted dumping condition;
an actuator assembly for moving said latch between said hooked position and said unhooked position, said actuator assembly being mountable to the vehicle such that moving the cargo bed from the horizontal transporting condition toward the inverted dumping condition moves said latch from said hooked position toward said unhooked position, said actuator assembly including:
a lever having a first end and a second end, a central portion of said lever being pivotally mountable on a side surface of the bottom wall of the cargo bed such that said first end of said lever is positioned generally adjacent to one of the side walls of the cargo bed, said second end of said lever is positioned generally adjacent to the frame of the vehicle such that a longitudinal axis of said lever generally intersects a longitudinal axis of the frame of the vehicle, a wheel being rotatably mounted on said second end of said lever, said lever being pivotal between a first position and a second position, wherein said first position is characterized by said first end of said lever being positioned relatively closer to the back wall of the cargo bed than the gate of the cargo bed, wherein said second position is characterized by said first end of said lever being position relatively closer to the gate of the cargo bed than the back wall of the cargo bed;
a coupling member for operationally coupling said lever to said latch, said coupling member having a first end and a second end, said first end of said coupling member being pivotally coupled to a first end of said lever member, said second end of said coupling member being pivotally coupled to said second end of said mounting portion of said latch such that moving said first end of said lever from said first position toward said second position moves said latch from said hooked position toward said unhooked position;
a biasing member for biasing said first end of said lever from said first position toward said second position when the cargo bed moves from the horizontal transporting condition toward the inverted dumping condition, said biasing member having a first end and a second end, said first end of said biasing member being mounted to a portion of said lever between said first end of said lever, and said portion of said lever pivotally mountable to the side surface of the bottom wall of the cargo bed, said second end of said biasing member being mountable to the side surface of the bottom wall of the cargo bed; and
a track for moving said lever from said second position toward said first position when the cargo bed moves from the inverted dumping condition toward the horizontal transporting condition, said track including:
a securing portion being securely mountable to the frame of the vehicle; and
a track portion extending perpendicularly away from said securing portion for selectively receiving said wheel of said lever, an upper surface of said track portion having a lip formed thereon for selectively preventing said wheel from traveling off said track, said track portion and said securing portion being mountable to the frame of the vehicle such that as said cargo bed moves from said inverted dumping condition toward said horizontal transporting condition said wheel travels along said upper surface of said track portion moving said lever from said second position toward said first position.

11. A latching assembly for a vehicle having a cargo bed pivotally mounted on a frame for carrying cargo, the cargo bed being pivotal between a horizontal transporting condition and an inverted dumping condition, the cargo bed having a bottom wall, a back wall and a pair of side walls, a gate being pivotally coupled to and extending between each of the side walls for containing the cargo when the cargo bed is in the horizontal transporting condition, said assembly comprising:

a latch for keeping the gate of the vehicle closed when the cargo bed is in the horizontal transporting condition, said latch comprising a hook portion having a bar formed thereon, said latch being positionable between a hook position and an unhooked position, wherein said hook position is characterized by said bar being selectively abutted against the gate when the cargo bed is in the horizontal transporting condition, wherein said unhooked position is characterized by said bar being positioned relatively away from the gate when the cargo bed is in the inverted dumping condition;

an actuator assembly being mountable to the vehicle and operationally coupled to said latch for moving said latch between said hooked position and said unhooked position;

wherein said actuator assembly includes a lever pivotally mountable on a side surface of the bottom wall of the cargo bed, said lever being operationally coupled to said latch;

wherein said lever is pivotal between a first position and a second position, wherein said first position is characterized by a first end of said lever being positioned relatively closer to the back wall of the cargo bed than the gate of the cargo bed, wherein said second position is characterized by said first end of said lever being position relatively closer to the gate of the cargo bed than the back wall of the cargo bed; and additionally including a track mountable to the frame of the vehicle for moving said lever from said second position toward said first position when the cargo bed moves from the inverted dumping condition toward the horizontal transporting condition.

12. The latching assembly of claim 11, wherein said latch additionally comprises a mounting portion being pivotally mountable to one of the side walls of the cargo bed, said hook portion being mounted on a first end of said mounting portion; and wherein said hook portion has a generally arcuate shape.

13. The latching assembly of claim 11, additionally including a wheel being rotatably mounted on a second end of said lever.

14. The latching assembly of claim 11, additionally including a coupling member for operationally coupling said lever to said latch, a first end of said coupling member being pivotally coupled to a first end of said lever member, a second end of said coupling member being pivotally coupled to said latch such that moving said first end of said lever from said first position toward said second position moves said latch from said hooked position toward said unhooked position.

15. The latching assembly of claim 11, additionally including a biasing member for biasing a first end of said lever from said first position toward said second position when the cargo bed moves from the horizontal transporting condition toward the inverted dumping condition, a first end of said biasing member being mounted to a portion of said lever, a second end of said biasing member being mountable to the side surface of the bottom wall of the cargo bed.

16. The latching assembly of claim 11, wherein said track includes:

a securing portion being securely mountable to the frame of the vehicle;

a track portion extending perpendicularly away from said securing portion for selectively receiving a wheel rotatably mounted on an end of said lever as said lever moves between said first and second positions.

17. The latching assembly of claim 16, wherein an upper surface of said track portion has a lip formed thereon for selectively preventing said wheel from traveling off said track.

18. The latching assembly of claim 17, said securing portion is mountable to the frame of the vehicle such that as said cargo bed moves from said inverted dumping condition toward said horizontal transporting condition said wheel travels along an upper surface of said track portion moving said lever from said second position toward said first position.

* * * * *